United States Patent
Curtis et al.

(10) Patent No.: US 9,341,794 B1
(45) Date of Patent: May 17, 2016

(54) THERMAL CONDUCTION SYSTEM

(71) Applicant: Cisco Technology, Inc., San Jose, CA (US)

(72) Inventors: George Edward Curtis, San Jose, CA (US); Keith Frank Tharp, San Jose, CA (US); Gary King Chan, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/661,375

(22) Filed: Mar. 18, 2015

(51) Int. Cl.
*G02B 6/00* (2006.01)
*G02B 6/42* (2006.01)
*H01R 13/66* (2006.01)
*G02B 6/38* (2006.01)

(52) U.S. Cl.
CPC ............ *G02B 6/4269* (2013.01); *G02B 6/3897* (2013.01); *G02B 6/4261* (2013.01); *H01R 13/6608* (2013.01)

(58) Field of Classification Search
CPC ............ G02B 6/4269; H05K 7/20409; H05K 7/20418
See application file for complete search history.

(56) References Cited

U.S. PATENT DOCUMENTS

| | | | | |
|---|---|---|---|---|
| 7,260,303 B2 * | 8/2007 | Bench | .................. | G02B 6/4246 385/134 |
| 8,333,598 B2 * | 12/2012 | Mulfinger | ............ | H01R 12/737 439/67 |
| 2013/0164970 A1 * | 6/2013 | Regnier | ............. | H05K 7/20509 439/487 |

* cited by examiner

*Primary Examiner* — Omar R Rojas
(74) *Attorney, Agent, or Firm* — Merchant & Gould P.C.

(57) ABSTRACT

A cage within a communication module may have a plurality of receptacles. A cover may cover at least a portion of the cage. A thermal conduction system may include a top wrap, a first side wrap, and a second side wrap. The top wrap may comprise a top wrap top portion covering at least a portion of the cover top side and a top wrap back portion covering at least a portion of the cover back side. The first side wrap may comprise a first side wrap back portion covering at least a portion of the top wrap back portion, a first side wrap side portion covering at least a portion of the cover first side, and first side fingers extending through a first slit in the cover into the cage. A heat sink may be attached to the first side wrap back portion.

20 Claims, 5 Drawing Sheets

THERMAL CONDUCTION SYSTEM

BACKGROUND

Data transmission, digital transmission, or digital communications is the physical transfer of data (e.g., a digital bit stream) over a point-to-point or point-to-multipoint communication channel. Examples of such channels are copper wires, optical fibers, wireless communication channels, and storage media. The data are represented as an electromagnetic signal, such as an electrical voltage, radiowave, microwave, or infrared signal.

While analog transmission is the transfer of a continuously varying analog signal, digital communications is the transfer of discrete messages. The messages are either represented by a sequence of pulses by a line code (e.g., baseband transmission), or by a limited set of continuously varying wave forms (e.g., passband transmission), using a digital modulation method. The passband modulation and corresponding demodulation is carried out by modem equipment. According to the most common definition of digital signal, both baseband and passband signals representing bit-streams are considered as digital transmission.

BRIEF DESCRIPTION OF THE DRAWINGS

The accompanying drawings, which are incorporated in and constitute a part of this disclosure, illustrate various embodiments of the present disclosure. In the drawings.

DETAILED DESCRIPTION

Overview

Figure 1:
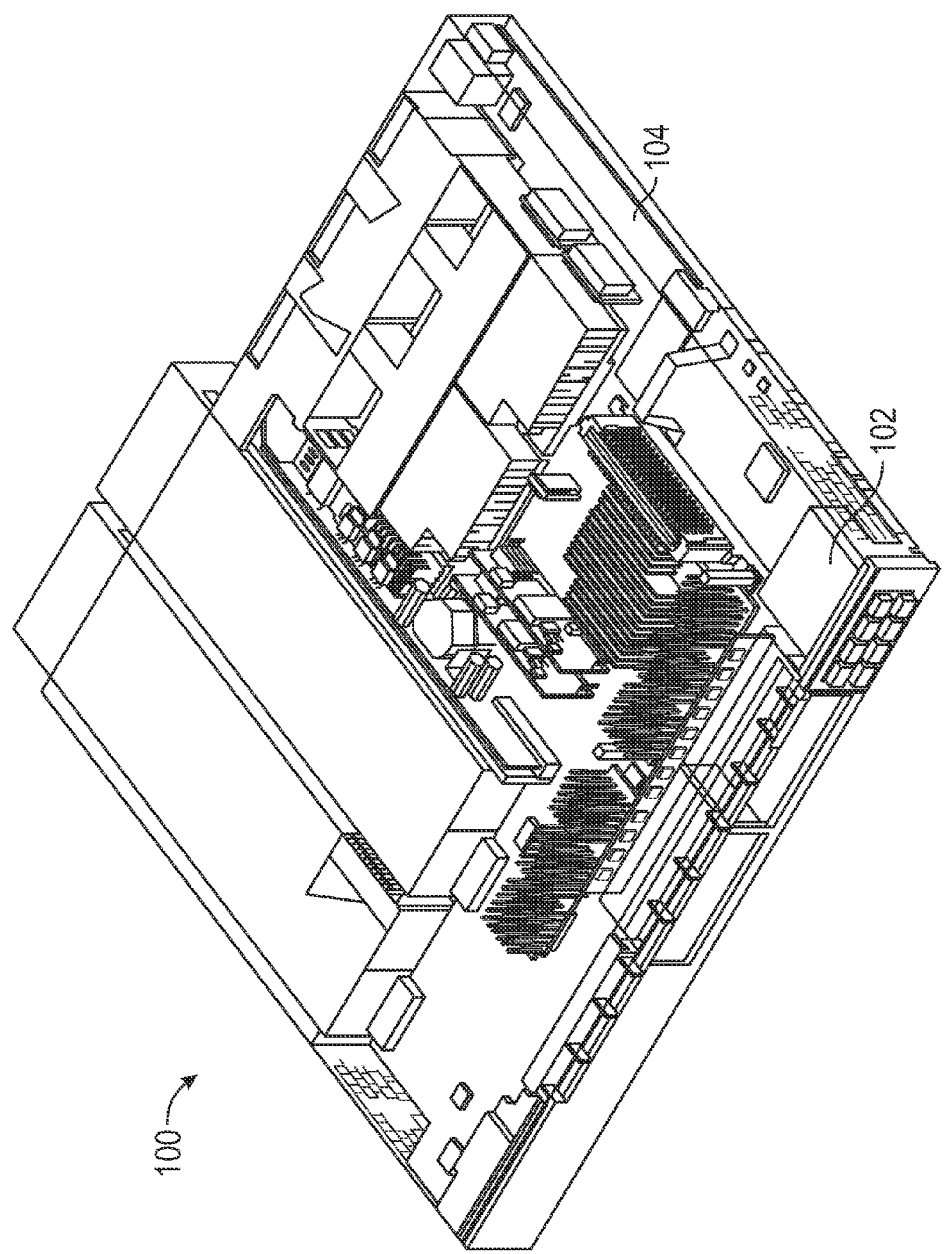
FIG. 1 shows a device.

A thermal conduction system may be provided. A cage within a communication module may have a plurality of receptacles. A cover may cover at least a portion of the cage. The cover may have a cover first side, a cover second side, a cover top side, and a cover back side. The thermal conduction system may include a top wrap, a first side wrap, and a second side wrap. The top wrap may comprise a top wrap top portion covering at least a portion of the cover top side and a top wrap back portion covering at least a portion of the cover back side. The first side wrap may comprise a first side wrap back portion covering at least a portion of the top wrap back portion, a first side wrap side portion covering at least a portion of the cover first side, and first side fingers extending through a first slit in the cover into the cage. The second side wrap may comprise a second side wrap back portion covering at least a portion of top wrap back portion, a second side wrap side portion covering at least a portion of the cover second side, and second side fingers extending through a second slit in the cover into the cage.

A heat sink may be attached to the first side wrap back portion and the second side wrap back portion. The heat sink may be configured to dissipate heat from a plurality of plugs respectively plugged into the plurality of receptacles. The plurality of receptacles may comprise walls/partitions configured to support ones of the plurality of plugs. The top wrap, the first side wrap, and the second side wrap may be configured to conduct the heat through the top wrap, the first side wrap, and the second side wrap to the heat sink.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Devices such as networking devices (e.g., networking switch or routers) may have plugs connected to them. These plugs may comprise, for example, small form-factor pluggable (SFP) (1 G) or SFP+ (10 G) transceivers. These plugs may be plugged into a cage of a communications module on the device including, for example, an SFP connector cage. Heat from the plugs may cause overheating of the communications module and may lead to malfunction. This may be a problem with current generation SFP+ high power modules (i.e., 1.5 W) and next generation SFP+Class III modules where power may step up to 2.0 W per plug. The combination of high power dissipation and low temperature limit (e.g., 70 C. case temp) may make cooling with conventional systems difficult.

Conventional cages (e.g., SFP connector cages) with thin steel walls, small vent perforations, and a large connector at the rear, may trap heat inside the conventional cage that may cause high temperature rise inside the conventional cage. Thin steel, for example, may not spread heat well. In addition, the combination of small vents and a large rear connector may yield low air velocity inside the conventional cage, thus SFP or SFP+ transceivers may not be cooled properly. To make the problem worse, SFP or SFP+ transceivers may be plugged into wide conventional cages with multiple SFP or SFP+ transceivers side by side (e.g., up to 12 wide) heating each other. To further worsen the problem, cages may be two or more levels high where SFP or SFP+ transceivers may be stacked two rows high. In this case, heat density may become extremely high and heat removal may be even more difficult due to lack of space.

FIG. 1 shows a device 100. As shown in FIG. 1, device 100 may comprise, but is not limited to, a network switch or a router. Device 100 may include a communication module 102 and a circuit board 104. Communication module 102 may be installed onto circuit board 104 from the top and either press fit or soldered in place for example. Communication module 102 may be used to send data from device 100 and receive data at device 100.

Figure 2A:
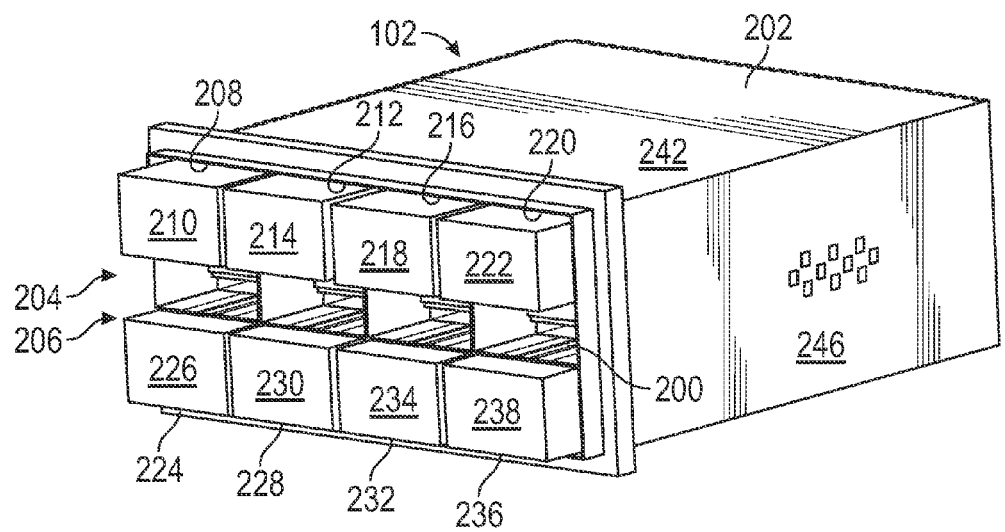
FIGS. 2A, 2B, and 2C show a communication module.
Figure 2B:
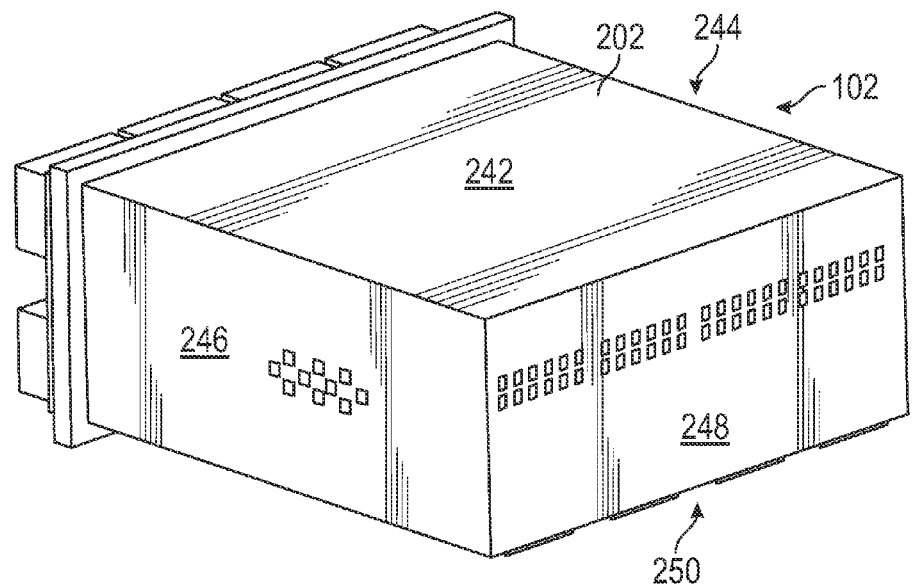
Figure 2C:
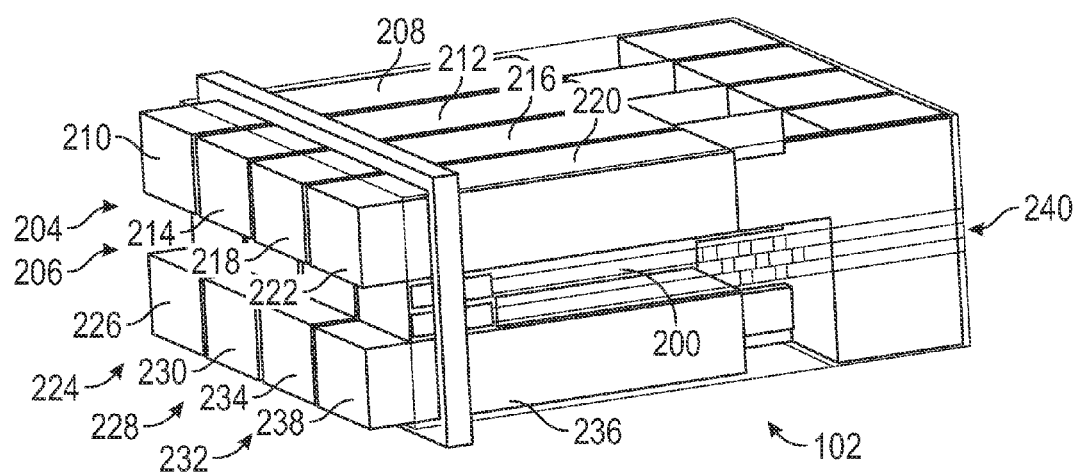

FIGS. 2A, 2B, and 2C show communication module 102 in more detail. As shown in FIGS. 2A, 2B, and 2C, communication module 102 may include a cage 200, a cover 202, and a plurality of receptacles 204. A plurality of plugs 206 may be respectively plugged into plurality of receptacles 204. Plurality of receptacles 204 may comprise a first receptacle 208, a second receptacle 212, a third receptacle 216, a fourth receptacle 220, a fifth receptacle 224, a sixth receptacle 228, a seventh receptacle 232, and an eighth receptacle 236. Plurality of receptacles 204 may comprise any number of receptacles and is not limited to eight. Plurality of plugs 206 may comprise a first plug 210, a second plug 214, a third plug 218, a fourth plug 222, a fifth plug 226, a sixth plug 230, a seventh plug 234, and an eighth plug 238. Plurality of plugs 206 may comprise any number of plugs and is not limited to eight. Plurality of receptacles 204 and plurality of plugs 206 may be stacked in two or more rows high.

Any one of plurality of plugs 206 may be respectively plugged into any one of plurality of receptacles 204. Once plugged into one of plurality of receptacles 204, one of plurality of plugs 206 may connect with one of plurality of connectors 240. Plurality of connectors 240 may connect or otherwise interface plurality of plugs 206 with circuit board 104. Cover 202 may comprise a cover top side 242, a cover first side 244, a cover second side 246, a cover back side 248, and a cover bottom side 250.

Each one of plurality of plugs 206 may comprise, but are not limited to, a compact, hot-pluggable transceiver used for both telecommunication and data communications applications. Through plurality of receptacles 204 and plurality of connectors 240, plurality of plugs 206 may interface circuit board 104 of device 100, for example, to fiber optic or copper networking cables respectively connected to plurality of plugs 206. Each one of plurality of plugs 206 may comprise, but are not limited to, an SFP or SFP+ transceiver for example. Heat from one or more of plurality of plugs 206 may build up in cage 200.

Figure 3:
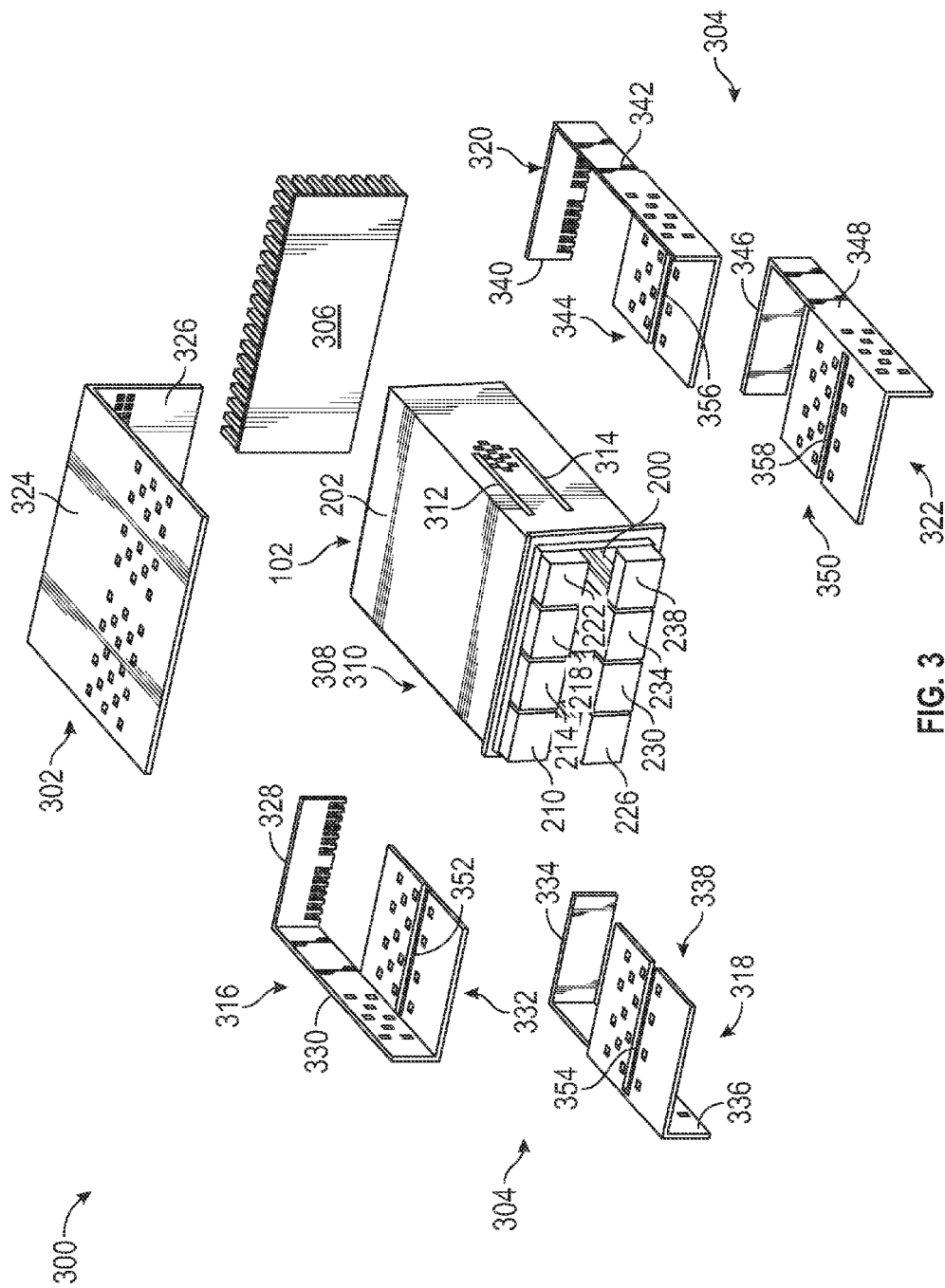
FIG. 3 shows an exploded view of a thermal conduction system.

FIG. 3 shows an exploded view of a thermal conduction system 300. Thermal conduction system 300 may dissipate heat caused by one or more of plurality of plugs 206 from cage 200. As shown in FIG. 3, thermal conduction system 300 may comprise a top wrap 302, a plurality of side wraps 304, and a heat sink 306. To accommodate thermal conduction system 300, cover 202 may include side slits (e.g., a first side upper slit 308, a first side lower slit 310, a second side upper slit 312, and a second side lower slit 314). Plurality of side wraps 304 may comprise a first side upper wrap 316, a first side lower wrap 318, a second side upper wrap 320, and a second side lower wrap 322. Top wrap 302 may include a top wrap top portion 324 and a top wrap back portion 326.

First side upper wrap 316 may include a first side upper wrap back portion 328, a first side upper wrap side portion 330, and first side upper fingers 332. First side lower wrap 318 may comprise a first side lower wrap back portion 334, a first side lower wrap side portion 336, and first side lower fingers 338. Second side upper wrap 320 may comprise a second side upper wrap back portion 340, a second side upper wrap side portion 342, and second side upper fingers 344. Second side lower wrap 322 may comprise a second side lower wrap back portion 346, a second side lower wrap side portion 348, and second side lower fingers 350.

Consistent with embodiments of the disclosure, thin conduction plates (e.g., top wrap 302 and plurality of side wraps 304) wrapped around cage 200 may provide a path for heat to travel to a heat sink 306 mounted on the rear, for example. Embodiments of the disclosure, including thermal conduction system 300, may be compatible with connectional press-fit SFP connector cages. The thin conduction plates (e.g., top wrap 302 and plurality of side wraps 304) may be used that reach inside cage 200 and that may wrap around the outside of cage 200 to carry heat from the source (e.g., plurality of plugs 206) to an external heat sink (e.g., heat sink 306) located on the rear of cage 200 for example. The rear may be the only area where empty space exists, however, the location of heat sink 306 is not limited to the rear. The thin conduction plates (e.g., top wrap 302 and plurality of side wraps 304) may reside within a narrow envelope slightly larger than cage 200 and conduct heat well. By cooling cage 200's walls (e.g., cover top side 242, cover first side 244, cover second side 246, cover back side 248, and cover bottom side 250), plurality of plugs 206 may also be cooled as they may, for example, be in contact with cage 200's walls.

The thin conduction plates (e.g., top wrap 302 and plurality of side wraps 304) may be, but are not limited to, copper plates 40 mils in thickness for example. Other materials such as aluminum, graphite, graphine, or thin heat pipes, for example, may be used to form the thin conduction plates (e.g., top wrap 302 and plurality of side wraps 304). The thin conduction plates may be nickel plated so that they may be reflow soldered to cage 200. In addition to the rear of cage 200, heat sink 306 may be installed on any of cage 200's walls (e.g., cover top side 242, cover first side 244, cover second side 246, cover back side 248, and cover bottom side 250), for example, when space is available. Rear mounted and top mounted heat sinks, for example, may be combined into a single heat sink.

Consistent with embodiments of the disclosure, cage 200 may be modified by adding small slits (e.g., first side upper slit 308, first side lower slit 310, second side upper slit 312, and second side lower slit 314) on the two sides (e.g., cover first side 244 and cover second side 246). These slits may allow conduction plate fingers (e.g., first side upper fingers 332, first side lower fingers 338, second side upper fingers 344, and second side lower fingers 350) to reach inside cage 200 from the sides and touch surfaces in cage 200 including, for example, plurality of plugs 206, which may be a heat source. Once installed in cage 200, first side upper fingers 332 may touch and thermally connect with second side upper fingers 344. Likewise, first side lower fingers 338 may touch and thermally connect with second side lower fingers 350.

First side upper fingers 332, first side lower fingers 338, second side upper fingers 344, and second side lower fingers 350 may be split (e.g., respectively at a first split 352, a second split 354, a third split 356, and a forth split 358) in the center of cage 200, for example, into a left set and a right set with a small air gap in between respectively. This may ease mechanical tolerances and allow both left and right sets to float and squeeze tightly on all contact surfaces. The thin conduction plates (e.g., top wrap 302 and plurality of side wraps 304) may have a small bend radius, and as needed, this radius may be die coined/swaged slightly outward to clear sharp corners of cage 200.

FIG. 3 shows a two level high cage configuration where a first portion of plurality of plugs 206 (e.g., first plug 210, second plug 214, third plug 218, and fourth plug 222) may be above a second portion of plurality of plugs 206 (e.g., fifth plug 226, sixth plug 230, seventh plug 234, and eighth plug 238). This configuration may present a thermal challenge since it may have a high power density and much of the heat may be trapped in the "belly" of cage 200. The "belly" may comprise an empty space in cage 200 between the first portion of plurality of plugs 206 and the second portion of plurality of plugs 206. Cage 200 may have open slits (e.g., first side upper slit 308, first side lower slit 310, second side upper slit 312, and second side lower slit 314) on the sides (e.g., cover first side 244 and cover second side 246) that may respectively allow conduction plate fingers (e.g., first side upper fingers 332, first side lower fingers 338, second side upper fingers 344, and second side lower fingers 350) to reach in "belly area" and, for example, touch a top side of the second portion of plurality of plugs 206 and a bottom side of the first portion of plurality of plugs 206.

Plurality of plugs 206 may produce heat. Thermal conduction system 300 may touch ones of plurality of plugs 206 in order to conduct heat from plurality of plugs 206 to heat sink 306. For example, first side upper fingers 332 may reach into cage 200 through first side upper slit 308 and touch the bottoms of a first portion of plurality of plugs 206 (e.g., first plug 210 and second plug 214). Likewise, first side lower fingers 338 may reach into cage 200 through first side lower slit 310 and touch, for example, the tops of a second portion of plurality of plugs 206 (e.g., fifth plug 226 and sixth plug 230.) Similarly, second side upper fingers 344 may reach into cage 200 through second side upper slit 312 and touch, for example, the bottoms of a third portion of plurality of plugs 206 (e.g., third plug 218 and fourth plug 222). And second side lower fingers 350 may reach into cage 200 through second side lower slit 314 and touch, for example, the tops of a forth portion of plurality of plugs 206 (e.g., seventh plug 234 and eighth plug 238). Side slits can also be present near the bottom of cage 200 to allow conduction fingers to reach inside and touch bottom surfaces of cage 200.

As stated above, plurality of plugs 206 may be respectively plugged into plurality of receptacles 204. Plurality of receptacles 204 may comprise partitions inside of cage 200 configured to support plurality of plugs 206. Heat from one or more of plurality of plugs 206 may be conducted and transferred into the partitions comprising plurality of receptacles 204 and into other walls internal to cage 200. The conduction plate fingers (e.g., first side upper fingers 332, first side lower fingers 338, second side upper fingers 344, and second side lower fingers 350) may contact the partitions comprising plurality of receptacles 204 and other walls internal to cage 200 in order to conduct heat from one or more of plurality of plugs 206. The conduction plate fingers may be soldered or otherwise affixed to the partitions comprising plurality of receptacles 204 and/or other walls internal to cage 200. In this embodiment, the conduction plate fingers may or may not be in direct contact any of plurality of plugs 206.

Once installed in cage 200, first side upper fingers 332 and second side upper fingers 344 may touch one another inside cage 200. Similarly, first side lower fingers 338 and second side lower fingers 350 may touch one another inside cage 200. Also, first side upper wrap back portion 328 and second side upper wrap back portion 340 may touch each other on cover back side 248 of cage 200. Likewise, first side lower wrap back portion 334 and second side lower wrap back portion 346 may touch each other on cover back side 248 of cage 200. The touching of the aforementioned elements may enhance the heat flow in thermal conduction system 300.

Consequently, heat may be collected from plurality of plugs 206, interior hot zones, and exterior surfaces of cage 200 and taken to heat sink 306 that may be mounted on the rear of cage 200 for example. Heat sink 306 may be mounted elsewhere on cage 200 and is not limited to being mounted on the rear of cage 200.

The thin conduction plates (e.g., top wrap 302 and plurality of side wraps 304) may be flush and attach firmly to interior and exterior surfaces of cage 200, which may reduce interface thermal resistance. Heat sink attachment surfaces may also be touched well, which may ensure good heat transfer characteristics. Solder or thermal compound can be used to attach the thin conduction plates to cover top side 242, cover first side 244, cover second side 246, cover back side 248, and cover bottom side 250.

The thin conduction plates (e.g., top wrap 302 and plurality of side wraps 304) may have small punched holes that may respectively line up with perforations in cover top side 242, cover first side 244, cover second side 246, cover back side 248, and cover bottom side 250 to maintain air ventilation. Holes, perforations, and slits on cage 200 may be small enough to maintain electromagnetic interference (EMI) integrity. The thin conduction plates may extract a majority of the heat from cage 200. The remaining heat may be extracted, for example, by forced air ventilation.

Figure 4:
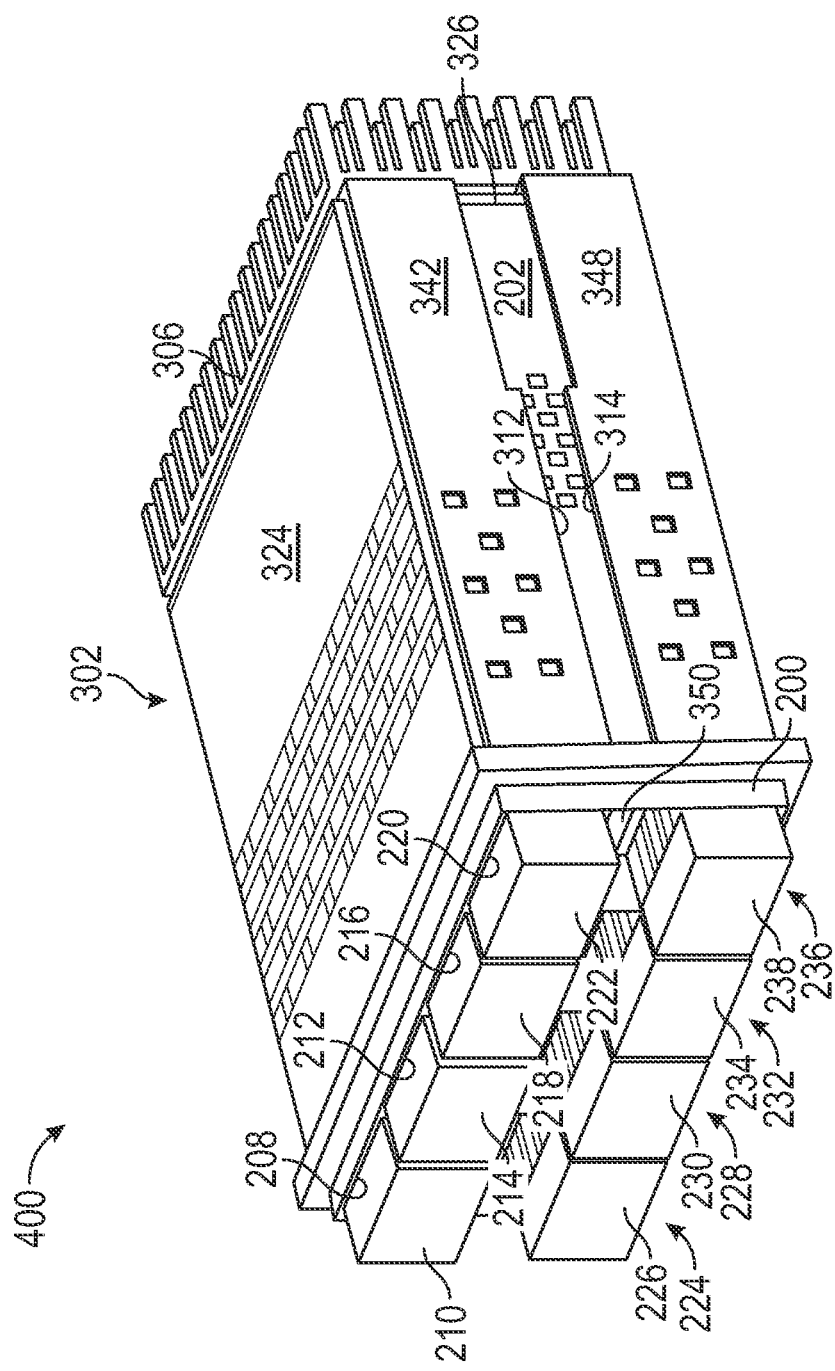
FIG. 4 shows a communication module with a thermal conduction system.

FIG. 4 shows a communication model 400 (i.e., communication module 102 with thermal conduction system 300 installed). As shown in FIG. 4, top wrap back portion 326 may fit against cover back side 248. First side upper wrap back portion 328, first side lower wrap back portion 334, second side upper wrap back portion 340, and second side lower wrap back portion 346 may fit against top wrap back portion 326. Heat sink 306 may be mounted to first side upper wrap back portion 328, first side lower wrap back portion 334, second side upper wrap back portion 340, and second side lower wrap back portion 346 by soldering or an adhesive, for example. In another embodiment, first side upper wrap back portion 328, first side lower wrap back portion 334, second side upper wrap back portion 340, and second side lower wrap back portion 346 may fit against cover back side 248. Top wrap back portion 326 may then fit against first side upper wrap back portion 328, first side lower wrap back portion 334, second side upper wrap back portion 340, and second side lower wrap back portion 346. Heat sink 306 may be mounted to Top wrap back portion 326 by soldering or an adhesive, for example.

Consistent with embodiments of the disclosure, an apparatus may be provided. The apparatus may include a cage having a plurality of receptacles and a cover covering at least a portion of the cage. The cover may have a cover top side and a cover back side. The apparatus may further include a top wrap comprising a top wrap top portion covering at least a portion of the cover top side and a top wrap back portion covering at least a portion of the cover back side. A heat sink may be attached to the top wrap back portion. The heat sink may be configured to dissipate heat from a plurality of plugs respectively plugged into the plurality of receptacles. The top wrap may be configured to conduct the heat through the top wrap to the heat sink.

Consistent with other embodiments of the disclosure, an apparatus may be provided. The apparatus may include a cage having a plurality of receptacles and a cover covering at least a portion of the cage. The cover may have a cover first side and a cover back side. The apparatus may further include a side wrap comprising a side wrap back portion covering at least a portion of the cover back side, a side wrap side portion covering at least a portion of the cover first side, and at least one side finger extending through a slit in the cover into the cage. A heat sink may be attached to the side wrap back portion. The heat sink may be configured to dissipate heat from a plug plugged into a one of the plurality of receptacles. The plug may be in contact with the at least one side finger. The side wrap may be configured to conduct the heat through the side wrap to the heat sink.

Consistent with yet other embodiments of the disclosure, an apparatus may be provided. The apparatus may include a thermal conduction system. A cage within a communication module may have a plurality of receptacles. A cover may cover at least a portion of the cage. The cover may have a cover first side, a cover second side, a cover top side, and a cover back side. The thermal conduction system may include a top wrap, a first side wrap, and a second side wrap. The top wrap may comprise a top wrap top portion covering at least a portion of the cover top side and a top wrap back portion covering at least a portion of the cover back side. The first side wrap may comprise a first side wrap back portion covering at least a portion of the top wrap back portion, a first side wrap side portion covering at least a portion of the cover first side, and first side fingers extending through a first slit in the cover into the cage. The second side wrap may comprise a second side wrap back portion covering at least a portion of top wrap back portion, a second side wrap side portion covering at least a portion of the cover second side, and second side fingers extending through a second slit in the cover into the cage.

A heat sink may be attached to the first side wrap back portion and the second side wrap back portion. The heat sink may be configured to dissipate heat from a plurality of plugs respectively plugged into the plurality of receptacles. A first portion of the plurality of plugs may be in contact with the first side fingers and a second portion of the plurality of plugs may be in contact with the second side fingers. The top wrap, the first side wrap, and the second side wrap may be configured to conduct the heat through the top wrap, the first side wrap, and the second side wrap to the heat sink.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. An apparatus comprising:
   a cage having a plurality of receptacles;
   a cover covering at least a portion of the cage, the cover having a cover top side and a cover back side;
   a top wrap comprising;
   a top wrap top portion covering at least a portion of the cover top side, and
   a top wrap back portion covering at least a portion of the cover back side; and
   a heat sink attached to the top wrap back portion, the heat sink configured to dissipate heat from a plurality of plugs respectively plugged into the plurality of receptacles, the top wrap being configured to conduct the heat through the top wrap to the heat sink.

2. The apparatus of claim 1, wherein each of the plurality of plugs comprises a small form-factor pluggable (SFP) transceiver.

3. The apparatus of claim 1, wherein the apparatus comprises a communication module disposed within a device comprising a networking device comprising one of the following: a network switch and a router.

4. The apparatus of claim 1, wherein the top wrap is approximately 40 mils thick.

5. The apparatus of claim 1, wherein the top wrap comprises copper.

6. An apparatus comprising:
   a cage having a plurality of receptacles;
   a cover covering at least a portion of the cage, the cover having a cover first side and a cover back side;
   a side wrap comprising;
   a side wrap back portion covering at least a portion of the cover back side,
   a side wrap side portion covering at least a portion of the cover first side, and
   at least one side finger extending through a slit in the cover into the cage; and
   a heat sink attached to the side wrap back portion, the heat sink configured to dissipate heat from a plug plugged into a one of the plurality of receptacles, the plug being in contact with a one of the plurality of receptacles and the at least one side finger being in contact with the one of the plurality of receptacles, the side wrap being configured to conduct the heat through the side wrap to the heat sink.

7. The apparatus of claim 6, wherein the apparatus comprises a communication module.

8. The apparatus of claim 7, wherein the communication module is disposed within a device.

9. The apparatus of claim 8, wherein the device comprises a networking device.

10. The apparatus of claim 9, wherein the networking device comprises one of the following: a network switch and a router.

11. The apparatus of claim 6, wherein the plug comprises a small form-factor pluggable (SFP) transceiver.

12. An apparatus comprising:
    a cage having a plurality of receptacles;
    a cover covering at least a portion of the cage, the cover having a cover first side, a cover second side, a cover top side, and a cover back side;
    a top wrap comprising;
    a top wrap top portion covering at least a portion of the cover top side, and
    a top wrap back portion covering at least a portion of the cover back side;
    a first side wrap comprising;
    a first side wrap back portion covering at least a portion of the top wrap back portion,
    a first side wrap side portion covering at least a portion of the cover first side, and
    first side fingers extending through a first slit in the cover into the cage;
    a second side wrap comprising;
    a second side wrap back portion covering at least a portion of top wrap back portion,
    a second side wrap side portion covering at least a portion of the cover second side, and
    second side fingers extending through a second slit in the cover into the cage; and
    a heat sink attached to the first side wrap back portion and the second side wrap back portion, the heat sink configured to dissipate heat from a plurality of plugs respectively plugged into the plurality of receptacles, a first portion of the plurality of plugs being in contact with the first side fingers and a second portion of the plurality of plugs being in contact with the second side fingers, wherein the top wrap, the first side wrap, and the second side wrap are configured to conduct the heat through the top wrap, the first side wrap, and the second side wrap to the heat sink.

13. The apparatus of claim 12, wherein the first side fingers and the second side fingers are in contact inside the cage.

14. The apparatus of claim 12, wherein each of the plurality of plugs comprises a small form-factor pluggable (SFP) transceiver.

15. The apparatus of claim 12, wherein the apparatus comprises a communication module.

16. The apparatus of claim 12, wherein the communication module is disposed within a device.

17. The apparatus of claim 12, wherein the device comprises a networking device.

18. The apparatus of claim 12, wherein the networking device comprises one of the following: a network switch and a router.

19. The apparatus of claim 12, wherein the top wrap, the first side wrap, and the second side wrap are each approximately 40 mils thick.

20. The apparatus of claim 12, wherein the heat sink comprises an aluminum pin fin heat sink.

\* \* \* \* \*